(12) United States Patent
Takahashi et al.

(10) Patent No.: US 12,395,399 B2
(45) Date of Patent: Aug. 19, 2025

(54) HISTORY MANAGEMENT APPARATUS, HISTORY MANAGEMENT METHOD, AND PROGRAM

(71) Applicant: Nippon Telegraph and Telephone Corporation, Tokyo (JP)

(72) Inventors: Kensuke Takahashi, Musashino (JP); Tomoki Ikegaya, Musashino (JP); Sho Kanemaru, Musashino (JP); Tsuyoshi Toyoshima, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 301 days.

(21) Appl. No.: 17/794,350

(22) PCT Filed: Feb. 4, 2020

(86) PCT No.: PCT/JP2020/004017
§ 371 (c)(1),
(2) Date: Jul. 21, 2022

(87) PCT Pub. No.: WO2021/156929
PCT Pub. Date: Aug. 12, 2021

(65) Prior Publication Data
US 2023/0069449 A1    Mar. 2, 2023

(51) Int. Cl.
*H04L 41/0654* (2022.01)
*H04L 41/069* (2022.01)
*H04L 41/122* (2022.01)

(52) U.S. Cl.
CPC ........ *H04L 41/0654* (2013.01); *H04L 41/069* (2013.01); *H04L 41/122* (2022.05)

(58) Field of Classification Search
CPC . H04L 41/0654; H04L 41/122; H04L 41/069; G06F 16/174; G06F 16/1865
See application file for complete search history.

(56) References Cited

U.S. PATENT DOCUMENTS

| | | | |
|---|---|---|---|
| 9,734,021 B1* | 8/2017 | Sanocki | H04L 41/0654 |
| 2007/0150678 A1* | 6/2007 | Tsukada | G06F 11/1456 |
| | | | 714/E11.125 |
| 2010/0226246 A1* | 9/2010 | Proulx | H04L 47/746 |
| | | | 370/228 |
| 2016/0253254 A1* | 9/2016 | Krishnan | G06F 11/0766 |
| | | | 717/124 |
| 2017/0244787 A1* | 8/2017 | Rangasamy | G06F 9/5077 |
| 2020/0192711 A1* | 6/2020 | Zhang | G06F 9/5005 |
| 2021/0011463 A1* | 1/2021 | Koh | G05B 19/4183 |

FOREIGN PATENT DOCUMENTS

JP    2018026709    2/2018

* cited by examiner

*Primary Examiner* — Joseph L Greene
(74) *Attorney, Agent, or Firm* — Fish & Richardson P.C.

(57) ABSTRACT

A record management apparatus 1 for managing an order record of an order executed for a control target is provided. The record management apparatus 1 includes: an order record storage unit 12 that stores the order record in association with a plurality of time axes; an order record registration unit 11 that receives the order record and registers the order record in association with the plurality of time axes in the order record storage unit 12; and an order record acquisition unit 13 that when a retrieval request with a task type designated is received, retrieves the order record from the order record storage unit according to the task type using the plurality of time axes.

9 Claims, 18 Drawing Sheets

| IDENTIFIER | URI | Body PART | CONTROL TARGET REFLECTION TIME | CONTROL TARGET CANCELLATION TIME | SYSTEM REFLECTION TIME | SYSTEM CANCELLATION TIME |
|---|---|---|---|---|---|---|
| SYSTEM 0 | /api | {BODY:1} | 2019/12/17 10:00:00 | Infinity | 2019/12/17 10:00:00 | Infinity |

| INFORMATION NAME | OVERVIEW |
| --- | --- |
| IDENTIFIER | IDENTIFIER UNIQUELY REPRESENTING CONTROL TARGET |
| URI | URI IN REST API |
| Body part | Body PART REQUESTED FOR CONTROL TARGET IN REST API |
| CONTROL TARGET REFLECTION TIME | TIME OF REFLECTION OF CONTENT OF API IN CONTROL TARGET |
| CONTROL TARGET CANCELLATION TIME | TIME OF CANCELLATION OF CONTENT OF API FOR CONTROL TARGET |
| SYSTEM REFLECTION TIME | TIME OF EXECUTION OF CONTENT OF API |
| SYSTEM CANCELLATION TIME | TIME OF CANCELLATION OF CONTENT OF API |

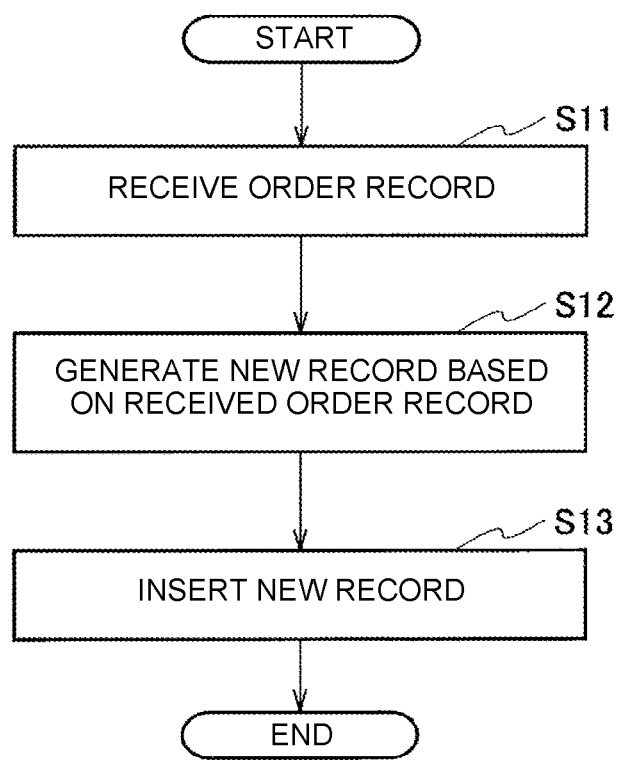

Fig. 4

| IDENTIFIER | URI | Body PART | CONTROL TARGET REFLECTION TIME | CONTROL TARGET CANCELLATION TIME | SYSTEM REFLECTION TIME | SYSTEM CANCELLATION TIME |
|---|---|---|---|---|---|---|
| SYSTEM 0 | /api | {BODY:1} | 2019/12/17 10:00:00 | Infinity | 2019/12/17 10:00:00 | Infinity |

| IDENTIFIER | URI | Body PART | CONTROL TARGET REFLECTION TIME | CONTROL TARGET CANCELLATION TIME | SYSTEM REFLECTION TIME | SYSTEM CANCELLATION TIME | |
|---|---|---|---|---|---|---|---|
| SYSTEM 0 | /api | {BODY:1} | 2019/12/17 10:00:00 | Infinity | 2019/12/17 10:00:00 | Infinity | 110 |
| SYSTEM 1 | /api | {BODY:2} | 2019/12/17 10:01:00 | Infinity | 2019/12/17 10:01:00 | Infinity | 120 |

Fig. 7

| IDENTIFIER | URI | Body PART | CONTROL TARGET REFLECTION TIME | CONTROL TARGET CANCELLATION TIME | SYSTEM REFLECTION TIME | SYSTEM CANCELLATION TIME | |
|---|---|---|---|---|---|---|---|
| SYSTEM 0 | /api | {BODY:1} | 2019/12/17 10:00:00 | Infinity | 2019/12/17 10:00:00 | 2019/12/17 10:02:00 | —110 |
| SYSTEM 1 | /api | {BODY:2} | 2019/12/17 10:01:00 | Infinity | 2019/12/17 10:01:00 | Infinity | |
| SYSTEM 0 | /api | {BODY:1} | 2019/12/17 10:00:00 | 2019/12/17 10:02:00 | 2019/12/17 10:02:00 | Infinity | —130 |
| SYSTEM 0 | /api | {BODY:3} | 2019/12/17 10:02:00 | Infinity | 2019/12/17 10:02:00 | Infinity | —140 |

Fig. 9

| IDENTIFIER | URI | Body PART | CONTROL TARGET REFLECTION TIME | CONTROL TARGET CANCELLATION TIME | SYSTEM REFLECTION TIME | SYSTEM CANCELLATION TIME |
|---|---|---|---|---|---|---|
| SYSTEM 0 | /api | [BODY:1] | 2019/12/17 10:00:00 | Infinity | 2019/12/17 10:00:00 | 2019/12/17 10:02:00 |
| SYSTEM 1 | /api | [BODY:2] | 2019/12/17 10:01:00 | Infinity | 2019/12/17 10:01:00 | Infinity ~120 |
| SYSTEM 0 | /api | [BODY:1] | 2019/12/17 10:00:00 | 2019/12/17 10:02:00 | 2019/12/17 10:02:00 | Infinity |
| SYSTEM 0 | /api | [BODY:3] | 2019/12/17 10:02:00 | Infinity | 2019/12/17 10:02:00 | Infinity ~140 |
| SYSTEM 1 | /api | [BODY:4] | Infinity | Infinity | 2019/12/17 10:03:00 | Infinity ~150 |

Fig. 11

| IDENTIFIER | URI | Body PART | CONTROL TARGET REFLECTION TIME | CONTROL TARGET CANCELLATION TIME | SYSTEM REFLECTION TIME | SYSTEM CANCELLATION TIME |
|---|---|---|---|---|---|---|
| SYSTEM 0 | /api | {BODY:1} | 2019/12/17 10:00:00 | Infinity | 2019/12/17 10:00:00 | 2019/12/17 10:02:00 |
| SYSTEM 1 | /api | {BODY:2} | 2019/12/17 10:01:00 | Infinity | 2019/12/17 10:01:00 | Infinity |
| SYSTEM 0 | /api | {BODY:1} | 2019/12/17 10:00:00 | 2019/12/17 10:02:00 | 2019/12/17 10:02:00 | Infinity |
| SYSTEM 0 | /api | {BODY:3} | 2019/12/17 10:02:00 | Infinity | 2019/12/17 10:02:00 | 2019/12/17 10:04:00 |
| SYSTEM 1 | /api | {BODY:4} | Infinity | Infinity | 2019/12/17 10:03:00 | Infinity |
| SYSTEM 0 | /api | {BODY:3} | 2019/12/17 10:02:00 | 2019/12/17 10:04:00 | 2019/12/17 10:04:00 | Infinity |

140 (row 4) — 160 (row 6)

Fig. 12

| IDENTIFIER | URI | Body PART | CONTROL TARGET REFLECTION TIME | CONTROL TARGET CANCELLATION TIME | SYSTEM REFLECTION TIME | SYSTEM CANCELLATION TIME |
|---|---|---|---|---|---|---|
| SYSTEM 0 | /api | [BODY:1] | 2019/12/17 10:00:00 | Infinity | 2019/12/17 10:00:00 | 2019/12/17 10:02:00 |
| SYSTEM 1 | /api | [BODY:2] | 2019/12/17 10:01:00 | Infinity | 2019/12/17 10:01:00 | Infinity |
| SYSTEM 0 | /api | [BODY:1] | 2019/12/17 10:00:00 | 2019/12/17 10:02:00 | 2019/12/17 10:02:00 | Infinity |
| SYSTEM 0 | /api | [BODY:3] | 2019/12/17 10:02:00 | Infinity | 2019/12/17 10:02:00 | 2019/12/17 10:04:00 |
| SYSTEM 1 | /api | [BODY:4] | Infinity | Infinity | 2019/12/17 10:03:00 | Infinity |
| SYSTEM 0 | /api | [BODY:3] | 2019/12/17 10:02:00 | 2019/12/17 10:04:00 | 2019/12/17 10:04:00 | Infinity |
| SYSTEM 1 | /api | [BODY:4] | Infinity | Infinity | 2019/12/17 10:05:00 | Infinity |

(120 indicates row 2; 170 indicates row 7)

Fig. 17

| IDENTIFIER | URI | Body PART | CONTROL TARGET REFLECTION TIME | CONTROL TARGET CANCELLATION TIME | SYSTEM REFLECTION TIME | SYSTEM CANCELLATION TIME |
|---|---|---|---|---|---|---|
| SYSTEM 0 | /api | [BODY:1] | 2019/12/17 10:00:00 | Infinity | 2019/12/17 10:00:00 | 2019/12/17 10:02:00 |
| SYSTEM 1 | /api | [BODY:2] | 2019/12/17 10:01:00 | Infinity | 2019/12/17 10:01:00 | Infinity |
| SYSTEM 0 | /api | [BODY:1] | 2019/12/17 10:00:00 | 2019/12/17 10:02:00 | 2019/12/17 10:02:00 | Infinity |
| SYSTEM 0 | /api | [BODY:3] | 2019/12/17 10:02:00 | Infinity | 2019/12/17 10:02:00 | Infinity |
| SYSTEM 1 | /api | [BODY:4] | Infinity | Infinity | 2019/12/17 10:03:00 | Infinity |
| SYSTEM 0 | /api | [BODY:5] | Infinity | Infinity | 2019/12/17 10:04:00 | Infinity |
| SYSTEM 1 | /api | [BODY:6] | Infinity | Infinity | 2019/12/17 10:05:00 | Infinity | ant
HISTORY MANAGEMENT APPARATUS, HISTORY MANAGEMENT METHOD, AND PROGRAM

CROSS-REFERENCE TO RELATED APPLICATIONS

This application is a National Stage application under 35 U.S.C. § 371 of International Application No. PCT/JP2020/004017, having an International Filing Date of Feb. 4, 2020. The disclosure of the prior application is considered part of the disclosure of this application, and is incorporated by reference in its entirety into this application.

TECHNICAL FIELD

The present invention relates to a record management apparatus, a record management method and a program.

BACKGROUND ART

For virtualized networks, isolation of a failed part and automation of failure restoration have been promoted (Patent Literature 1).

CITATION LIST

Patent Literature

Patent Literature 1: Japanese Patent Laid-Open No. 2018-26709

SUMMARY OF THE INVENTION

Technical Problem

Where a system that provides a service has a redundant configuration, upon a failure of one system, the service is continued, and orders are provided for the active system but no orders are provided to the failed system. At the time of restoration, in order to keep a service state before the failure, it is necessary to perform restoration based on the active system. In other words, it is necessary to restore the failed system not with an order last provided for the failed system but with an order that brings the failed system into a state that is the same as that of the active system. If only records of orders provided are merely managed, there is a problem in that an order record having consistency with the service state is unknown.

The present invention has been made in view of the above and an object of the present invention is to enable restoration in consistency with a service state.

Means for Solving the Problem

A record management apparatus according to an aspect of the present invention is a record management apparatus for managing an order record of an order executed for a control target, the record management apparatus including: a record storage unit that stores the order record in association with a plurality of time axes; a record registration unit that receives the order record and registers the order record in association with the plurality of time axes in the record storage unit; and a record acquisition unit that when a retrieval request with a task type designated is received, retrieves the order record from the record storage unit according to the task type using the plurality of time axes.

Effects of the Invention

The present invention enables restoration in consistency with a service state.

BRIEF DESCRIPTION OF DRAWINGS

FIG. 2 is a diagram illustrating example items of an order record managed by an order record storage unit.
FIG. 3 is a flowchart illustrating a flow of processing for registering a record of a new registration order.
FIG. 4 is a diagram illustrating an example of a table in which a record of a new registration order executed for a system 0, which is a control target, is registered.
FIG. 5 is a diagram illustrating an example of a table in which a record of a new registration order executed for a system 1, which is a control target, is registered.
FIG. 7 is a diagram illustrating an example of a table in which a record of a modification order executed for the system 0, which is a control target, is registered.
FIG. 9 is a diagram illustrating an example of a table in which a record of an order failure for the system 1, which is a control target, is registered.
FIG. 11 is a diagram illustrating an example of a table in which a record of a deletion order executed for the system 0, which is a control target, is registered.
FIG. 12 is a diagram illustrating an example of a table in which a record of an order failure for the system 1, which is a control target, is registered.
FIG. 17 is a diagram illustrating an example of an order record table for describing the processing for an order for restoration of the system 1.

DESCRIPTION OF EMBODIMENTS

An embodiment of the present invention will be described below with reference to the drawings.

Figure 1:
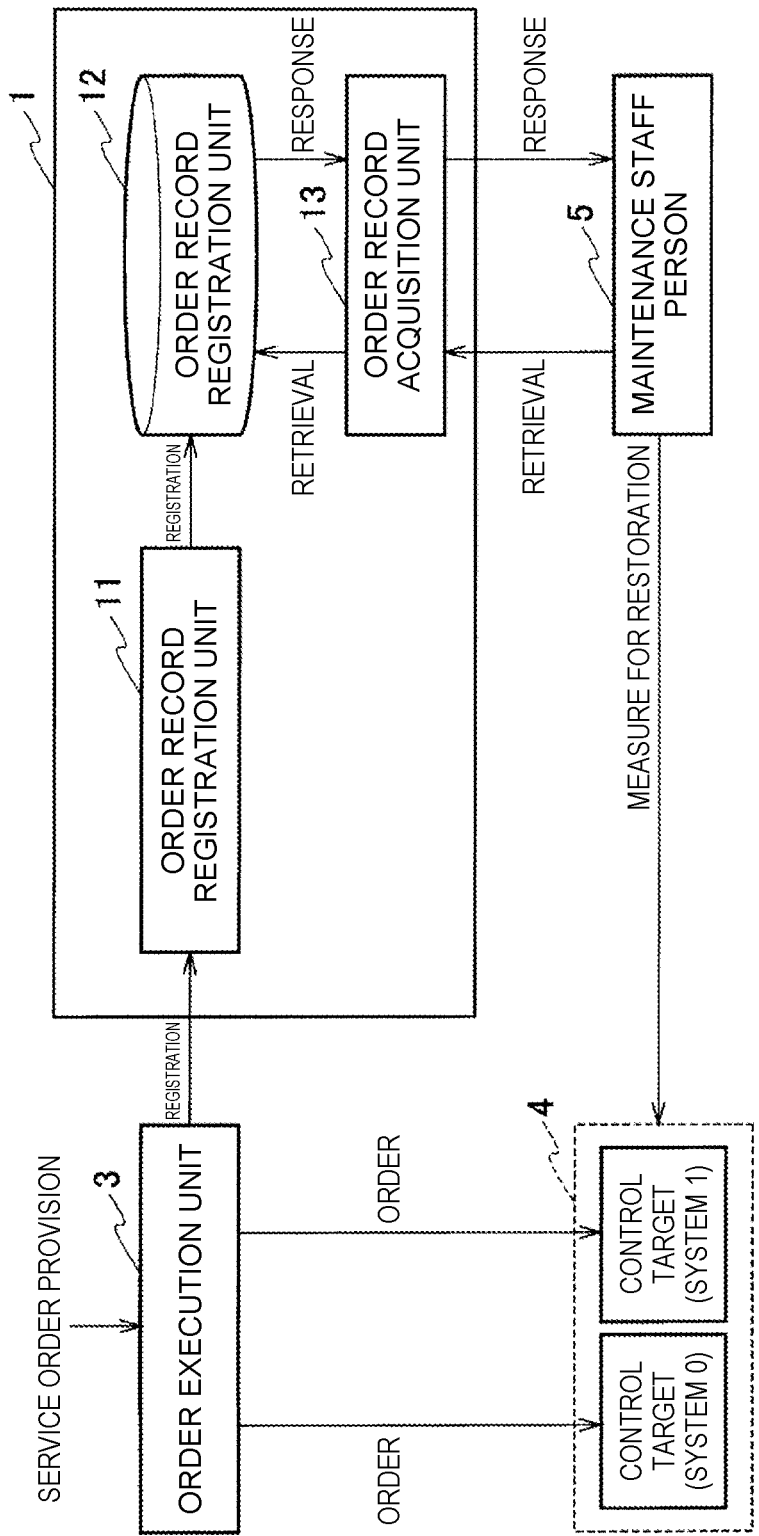
FIG. 1 is a diagram illustrating an example of an overall configuration of a system including an order record management apparatus according to the present embodiment.

An example of an overall configuration of a system including an order record management apparatus 1 of the present embodiment will be described with reference to FIG. 1.

An order execution unit 3 receives a service order according to, e.g., new application for, modification for, or cancellation of, a service and executes processing according to the service order for a control target 4 such as an apparatus and a system that provide the service. Hereinafter, processing according to a service order is referred to as "order". Also, a content reflected in the control target 4 may also be referred to as "order".

The control target 4 can be controlled using REST API according to a principle of REST (REpresentational State Transfer). In REST API, neither session management nor state management is performed and calls for a same URI produce a same result. Even if a failure occurs in the control target 4, state restoration is possible by executing orders that are the same as those before the occurrence of the failure. Types of orders for the control target 4 include new registration (POST), modification (PUT) and deletion (DELETE) according to REST API. An order for the control target 4 is executed by an HTTP request in which a method and a URI corresponding to a type of the order are designated being transmitted to the control target 4. The HTTP request may include a Body part.

The control target 4 has a redundant configuration and includes a system 0 and a system 1. The order execution unit 3 executes a same order for each of the system 0 and the system 1 in the control target 4.

The order record management apparatus 1 manages order records using two time axes that are a time axis on execution of orders and a time axis on completion of reflection of executed orders in the control target 4. More specifically, the order record management apparatus 1 manages URIs and Body parts indicating contents of respective orders for each control target 4 that executed the orders, according to types of the orders, using two time axes of control target reflection time and control target cancellation time, and system reflection time and system cancellation time. The order record management apparatus 1 also manages records of order failures (FAIL) in which execution of an order failed. Order types that an order record registration unit 11 can register are new registration (POST), modification (PUT), deletion (DELETE) and order failure (FAIL).

At the time of failure restoration, a maintenance staff person 5 acquires orders according to task types from the order record management apparatus 1 and takes a measure for restoration of the control target 4. More specifically, the maintenance staff person 5 acquires a newest reflected order, a newest executed order, an order for restoration of the system 0 and an order for restoration of the system 1 from the order record management apparatus 1 and takes a measure for restoration of the control target 4. A newest reflected order is an order reflected in the control target 4. A newest executed order is an order executed last for the control target 4. An order for restoration of the system 0 is an order for restoration of the system 0 of the control target 4. An order for restoration of the system 1 is an order for restoration of the system 1 of the control target 4. Instead of the maintenance staff person 5, a service monitoring apparatus (not illustrated) may acquire order records from the order record management apparatus 1 and perform restoration of the control target 4.

Next, a configuration of the order record management apparatus 1 will be described. The order record management apparatus 1 illustrated in FIG. 1 includes the order record registration unit 11, an order record storage unit 12 and an order record acquisition unit 13.

The order record registration unit 11 accepts registration of a record of an order executed for the control target 4 by the order execution unit 3 and stores the record of the order in the order record storage unit 12. The order record registration unit 11 inputs, for example, an order type, an identifier of the control target 4, a URI and a Body part and stores a record including the identifier, the URI and the Body part in the order record storage unit 12 by means of processing according to the order type. Details of the processing in the order record registration unit 11 will be described later.

The order record storage unit 12 manages order records using the time axis on execution of orders and the time axis on reflection of executed orders in the control target 4. FIG. 2 indicates example items of an order record managed by the order record storage unit 12. An identifier is an identifier uniquely representing the control target 4. For example, an identifier representing the system 0 or the system 1 of the control target 4 in FIG. 1 is provided. A URI is a URI in REST API. A Body part is a Body part requested for the control target 4 in REST API. An order executed for the control target 4 can be reproduced by a URI and a Body part. A control target reflection time is a time of reflection of an API content (order) formed of a URI and a Body part in the control target 4. It is possible to represent no reflection of the order in the control target 4 by inputting a time that is much later than a current time (for example, "Infinity") as the control target reflection time. A control target cancellation time is a time of cancellation of an order for the control target 4. For example, when a relevant order is cancelled by a modification order or a deletion order, a control target cancellation time is input. An order whose control target cancellation time is earlier than a current time is an order for the control target 4, the order being already cancelled, or an order not reflected in the control target 4. A system reflection time is a time of execution of an order. A system cancellation time is a time of execution of cancellation of an order. In other words, a system cancellation time is a time of execution of a modification order or a deletion order. For example, when a modification order or a deletion order is executed for an order executed for the control target 4, a system cancellation time is input. A record whose system cancellation time is earlier than a current time is a record already invalidated.

The order record acquisition unit 13 receives an order record retrieval request and retrieves an order record according to the retrieval request from the order record storage unit 12 and returns the order record. For example, the order record acquisition unit 13 returns order records according to a retrieval request with a task type designated, such as a newest reflected order, a newest executed order, an order for restoration of the system 0 or an order for restoration of the system 1. Since the order record acquisition unit 13 returns order records according to a task type, it is possible to acquire the order records in such a manner that a data model of order records in the order record storage unit 12 is hidden.

Next, processing for registration of an order record will be described. Processing for registration of an order record is different depending on the order types. More specifically, processing for registration of an order record is different depending on new registration, modification, deletion and order failure, respectively. In the below, processing for registration of an order record will be described for each order type while a specific example of an order record to be registered being indicated.

First, processing for registering a record of a new registration order will be described with reference to FIG. 3. It is assumed that the control target 4 has a redundant configuration including the system 0 and the system 1. The order execution unit 3 executes an order for the system 0 and the system 1 of the control target 4 in turn, and registers a record of the order reflected in the control target 4, in the order record management apparatus 1.

In step S11, the order record registration unit 11 receives a record of a new registration order, the record including an identifier, a URI and a Body part.

In step S12, the order record registration unit 11 generates a new record based on the received order record. More specifically, as illustrated in FIG. 4, the order record registration unit 11 generates a new record 110 including the identifier, the URI and the Body part received in step S11, stores a current time as a control target reflection time and a system reflection time and stores Infinity as a control target cancellation time and a system cancellation time.

In step S13, the order record registration unit 11 stores the record generated in step S12, in the order record storage unit 12.

Likewise, a record of the new registration order executed for the system 1 of the control target 4 is registered. As indicated in the table in FIG. 5, in a newly generated record 120, information pieces received from the order execution unit 3 are stored as an identifier, a URI and a Body part. A current time is stored as a control target reflection time and a system reflection time. Infinity is stored as a control target cancellation time and a system cancellation time.

Figure 6:
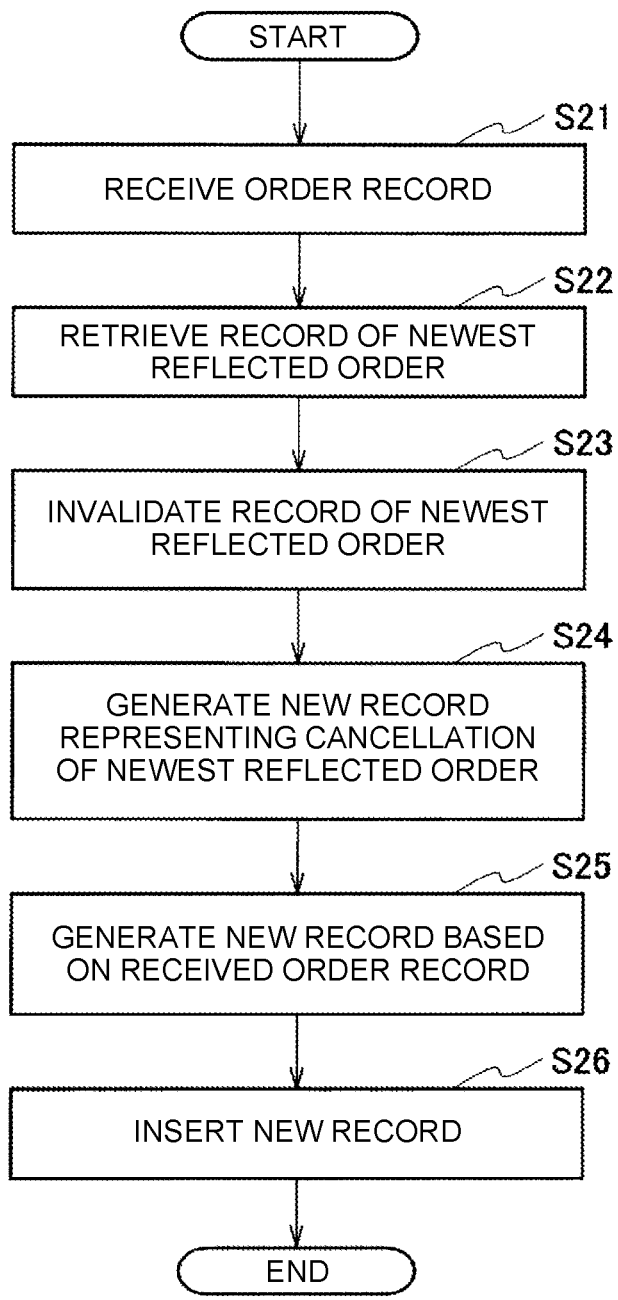
FIG. 6 is a flowchart illustrating a flow of processing for registering a record of a modification order.

Subsequently, processing for registering a record of a modification order will be described with reference to FIG. 6. It is assumed that in the state illustrated in FIG. 5, a modification order was executed for the system 0 and the system 1 of the control target 4. A record of the modification order reflected in the control target 4 is registered through the following processing.

In step S21, the order record registration unit 11 receives a record of the modification order, the record including an identifier, a URI and a Body part.

In step S22, the order record registration unit 11 retrieves a record of a newest order reflected in the control target 4 from the order record storage unit 12. More specifically, the order record registration unit 11 retrieves a record including the identifier and the URI received in step S21, a control target reflection time of the record being earlier than a current time, a control target cancellation time of the record being not earlier than the current time, a system reflection time of the record being earlier than the current time, a system cancellation time of the record being not earlier than the current time. For example, where a record of the modification order for the system 0 of the control target 4 is to be registered, the record 110 is retrieved from the table in FIG. 5.

In step S23, the order record registration unit 11 invalidates the record of the newest reflected order. More specifically, as indicated in the table in FIG. 7, the order record registration unit 11 stores the current time as a system cancellation time of the record 110 retrieved in step S22.

In step S24, the order record registration unit 11 generates a new record representing cancellation of the newest reflected order for the control target 4. More specifically, as indicated in the table in FIG. 7, the order record registration unit 11 generates a new record 130 including an identifier, a URI, a Body part and a control target reflection time that are the same as those of the record 110 and stores the current time as a control target cancellation time and a system cancellation time and stores Infinity as a system cancellation time.

In step S25, the order record registration unit 11 generates a new record based on the received order record. More specifically, as indicated in the table in FIG. 7, the order record registration unit 11 newly generates a record 140 including the identifier, the URI and the Body part received in step S21 and stores the current time as a control target reflection time and a system reflection time and stores Infinity as a control target cancellation time and a system cancellation time.

In step S26, the order record registration unit 11 stores the records generated in steps S23 and S24 in the order record storage unit 12.

Figure 8:
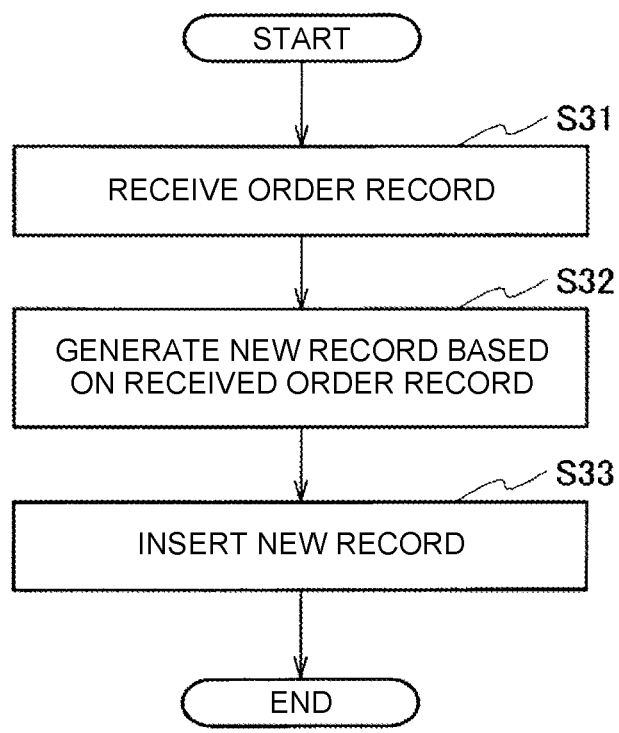
FIG. 8 is a flowchart illustrating a flow of processing for registering a record of an order failure.

Next, processing for registering a record of an order failure will be described with reference to FIG. 8. It is assumed that in the state illustrated in FIG. 7, a modification order for the system 1 of the control target 4 was executed but was not reflected in the system 1 of the control target 4 because of an error. A record of the order failure of the order not reflected in the control target 4 is registered through the following processing.

In step S31, the order record registration unit 11 receives information of the failed order, the information including an identifier, a URI and a Body part.

In step S32, the order record registration unit 11 generates a new record based on the received order record. More specifically, as indicated in the table in FIG. 9, the order record registration unit 11 newly generates a record 150 including a content of the failed order and stores a current time as a system reflection time and stores Infinity as a control target reflection time, a control target cancellation time and a system cancellation time.

In step S33, the order record registration unit 11 stores the record generated in step S32, in the order record storage unit 12.

Figure 10:
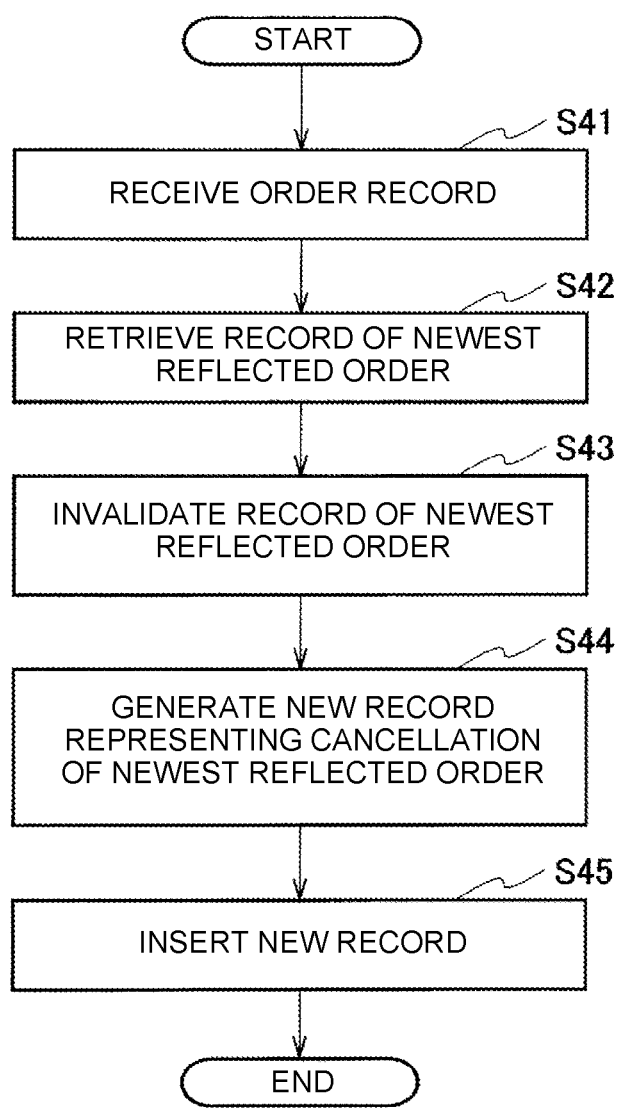
FIG. 10 is a flowchart illustrating a flow of processing for registering a record of a deletion order.

Next, processing for registering a record of a deletion order will be described with reference to FIG. 10. It is assumed that in the state indicated in FIG. 9, a deletion order was executed for the system 0 and the system 1 of the control target 4. A record of the executed deletion order is registered through the following processing.

In step S41, the order record registration unit 11 receives a record of a deletion order, the record including an identifier, a URI and a Body part.

In step S42, the order record registration unit 11 retrieves a record of a newest order reflected in the control target 4 from the order record storage unit 12. More specifically, the order record registration unit 11 retrieves a record including the identifier and the URI received in step S41, a control target reflection time of the record being earlier than a current time, a control target cancellation time of the record being not earlier than the current time, a system reflection time of the record being earlier than the current time, a system cancellation time of the record being not earlier than the current time. For example, where a record of the deletion order for the system 0 of the control target 4 is to be registered, the record 140 is retrieved from the table in FIG. 9.

In step S43, the order record registration unit 11 invalidates the record of the newest reflected order. More specifically, as indicated in the table in FIG. 11, the order record registration unit 11 stores the current time as the system cancellation time of the record 140 retrieved in step S42.

In step S44, the order record registration unit 11 generates a new record representing cancellation of the newest reflected order for the control target 4. More specifically, as indicated in the table in FIG. 11, the order record registration unit 11 newly generates a record 160 including an identifier, a URI, Body part and a control target reflection time that are the same as those of the record 140, stores the current time as a control target cancellation time and a system cancellation time and stores Infinity as a system cancellation time.

In step S45, the order record registration unit 11 stores the record generated in step S44, in the order record storage unit 12.

Here, it is assumed that the deletion order executed for the system 1 of the control target 4 failed. FIG. 12 illustrates an example of a table in which a record of the order failure is registered. A new record 170 including a content of the failed order, the current time being stored as a system reflection time of the record, Infinity being stored as a control target reflection time, a control target cancellation time and a system cancellation time of the record, is registered.

Next, processing for acquiring an order record will be described. In response to a retrieval request with a task type designated, the order record acquisition unit 13 acquires and returns an order record in such a manner that the plurality of time axes for managing an order record are hidden. More specifically, where an order record is to be acquired from the order record acquisition unit 13, an order record meeting conditions can be acquired by designating a newest reflected order, a newest executed order, an order for restoration of the system 0 or an order for restoration of the system 1 as a task type.

Figure 13:
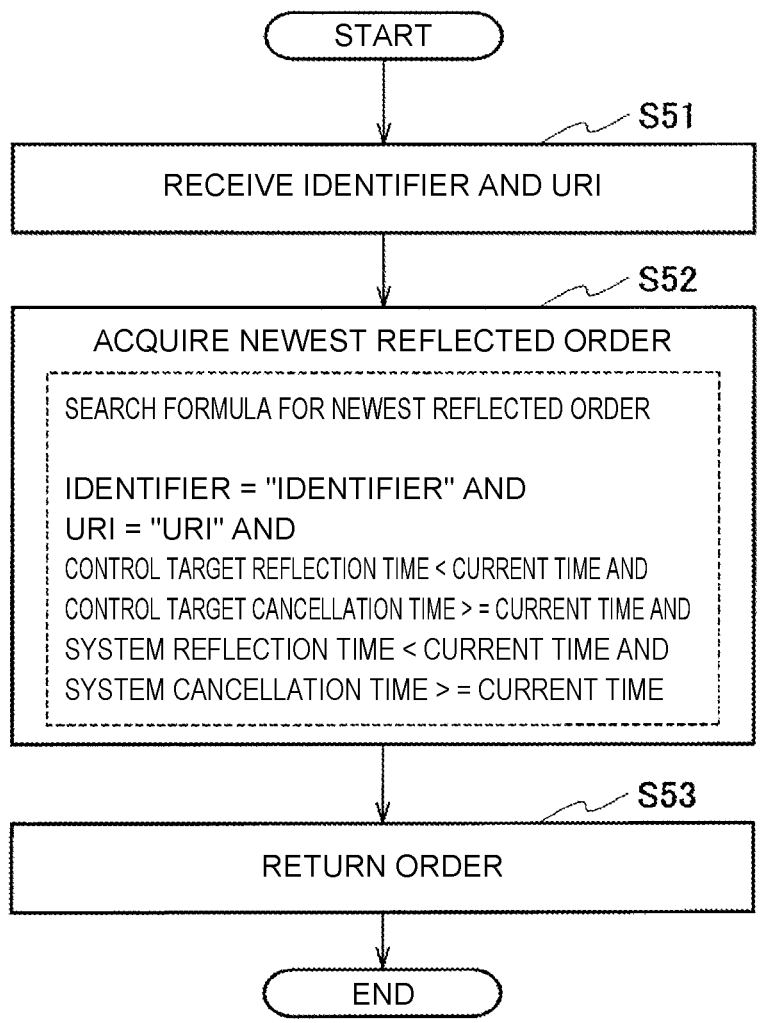
FIG. 13 is a flowchart illustrating a flow of processing for acquiring a newest reflected order.

First, processing for acquiring a newest reflected order will be described with reference to FIG. 13.

In step S51, the order record acquisition unit 13 receives an identifier and a URI.

In step S52, the order record acquisition unit 13 acquires a newest reflected order whose identifier and URI are coincident with the identifier and the URI. More specifically, the order record acquisition unit 13 acquires an order record, an identifier and a URI of the order record being coincident with the identifier and the URI, a control target reflection time of the order record being earlier than a current time, a control target cancellation time of the order record being not earlier than the current time, a system reflection time of the order record being earlier than the current time, a system cancellation time of the order record being not earlier than the current time, from the order record storage unit 12.

In step S53, the order record acquisition unit 13 returns the order record acquired in step S52.

Figure 14:
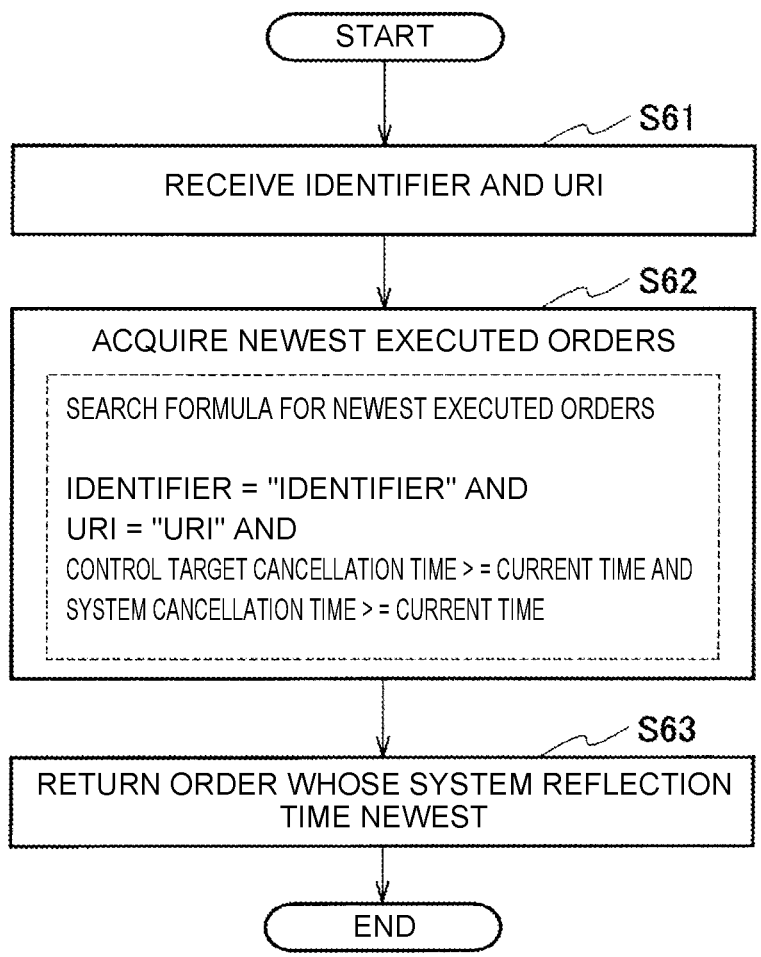
FIG. 14 is a flowchart illustrating a flow of processing for acquiring a newest executed order.

Next, processing for acquiring a newest executed order will be described with reference to FIG. 14.

In step S61, the order record acquisition unit 13 receives an identifier and a URI.

In step S62, the order record acquisition unit 13 acquires newest executed orders whose respective identifiers and URIs are coincident with the identifier and the URI. More specifically, the order record acquisition unit 13 acquires order records, an identifier and a URI of each order record being coincident with the identifier and the URI, a control target cancellation time of each order record being not earlier than a current time, a system cancellation time of each order record being not earlier than the current time, from the order record storage unit 12.

In step S63, the order record acquisition unit 13 returns an order record whose system reflection time is newest in the order records acquired in step S62.

Figure 15:
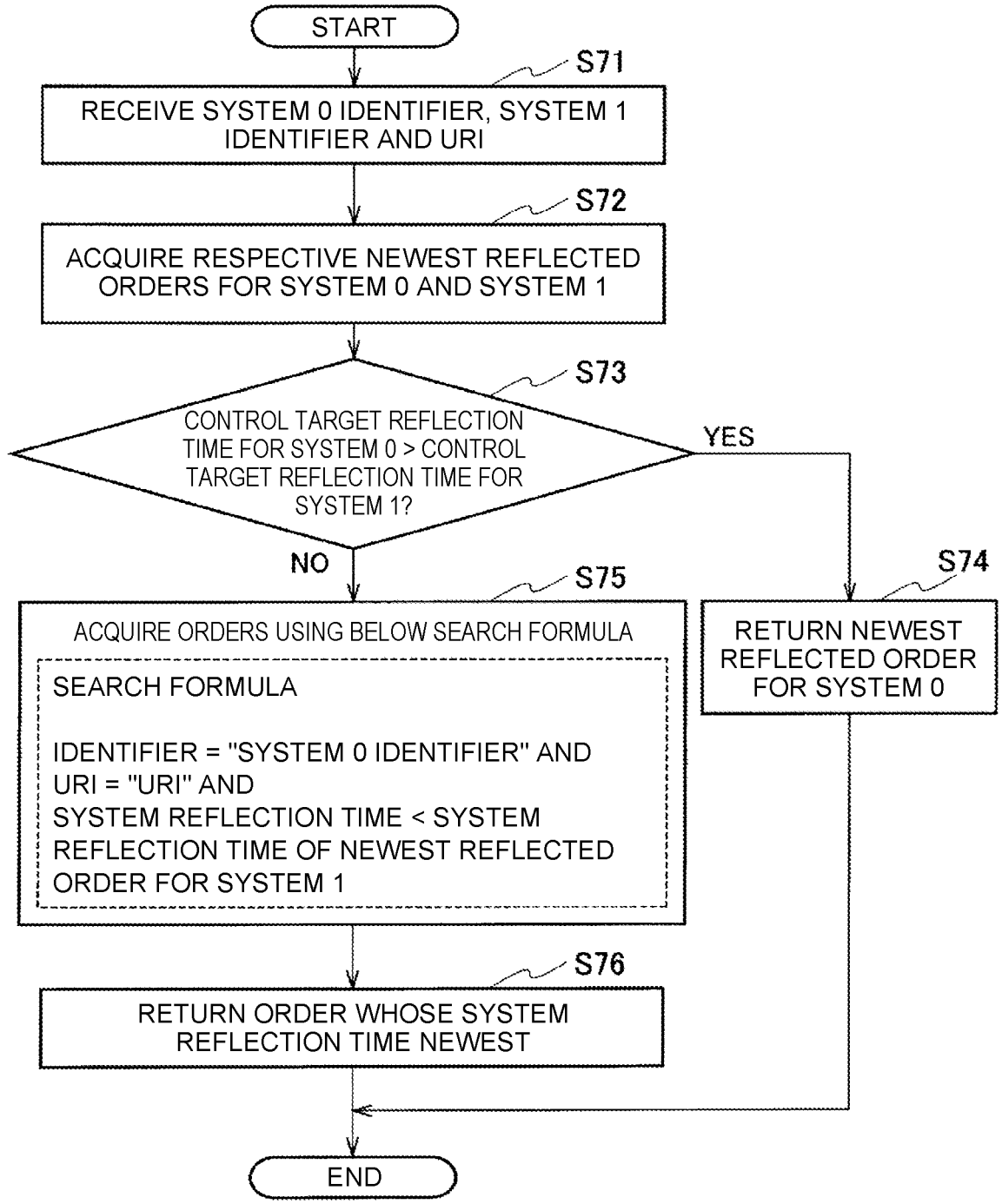
FIG. 15 is a flowchart illustrating a flow of processing for acquiring an order for restoration of the system 0.

Subsequently, processing for acquiring an order for restoration of the system 0 will be described with reference to FIG. 15.

In step S71, the order record acquisition unit 13 receives a system 0 identifier, a system 1 identifier and a URI.

In step S72, the order record acquisition unit 13 acquires a newest reflected order for each of the system 0 and the system 1. The newest reflected orders are acquired using the conditional expressions indicated in step S52 in FIG. 13.

In step S73, the order record acquisition unit 13 compares control target reflection times for the system 0 and the system 1, which have been acquired in step S72.

If the control target reflection time for the system 0 is not earlier than the control target reflection time for the system 1, in step S74, the order record acquisition unit 13 returns the newest reflected order for the system 0.

If the control target reflection time for the system 0 is earlier than the control target reflection time for the system 1, in step S75, the order record acquisition unit 13 acquires order records, an identifier and a URI of each order record being coincident with those of the system 0, a system reflection time of each order record being earlier than the system reflection time of the newest reflected order for the system 1.

In step S76, the order record acquisition unit 13 returns an order record whose system reflection time is newest in the order records acquired in step S75.

Next, processing for acquiring an order for restoration of the system 1 will be described with reference to FIG. 16.

In step S81, the order record acquisition unit 13 receives a system 0 identifier, a system 1 identifier and an URI.

In step S82, the order record acquisition unit 13 acquires a newest reflected order for each of the system 0 and the system 1. The newest reflected orders can be acquired using the conditional expressions indicated in step S52 in FIG. 13.

In step S83, the order record acquisition unit 13 compares control target reflection times for the system 0 and the system 1, which have been acquired in step S82.

If the control target reflection time for the system 1 is not earlier than the control target reflection time for the system 0, in step S84, the order record acquisition unit 13 returns the newest reflected order for the system 1.

If the control target reflection time for the system 1 is earlier than the control target reflection time for the system 0 in step S85, the order record acquisition unit 13 acquires order records, a system 1 identifier and a URI of each order record being coincident with the system 1 identifier and the URI, a system reflection time of each order record being later than a system reflection time of the newest reflected order for the system 0.

In step S86, the order record acquisition unit 13 returns an order record whose system reflection time is oldest in the order records acquired in step S85.

Here, the processing for acquiring an order for restoration of the system 1 will be described more specifically with reference to the table in FIG. 17. The table in FIG. 17 is one resulting from addition of records 160, 170 of order failures to the table in FIG. 9. The record 160 is a record registered when an order for the system 0 failed. The record 170 is a record registered when an order for the system 1 failed.

Figure 16:
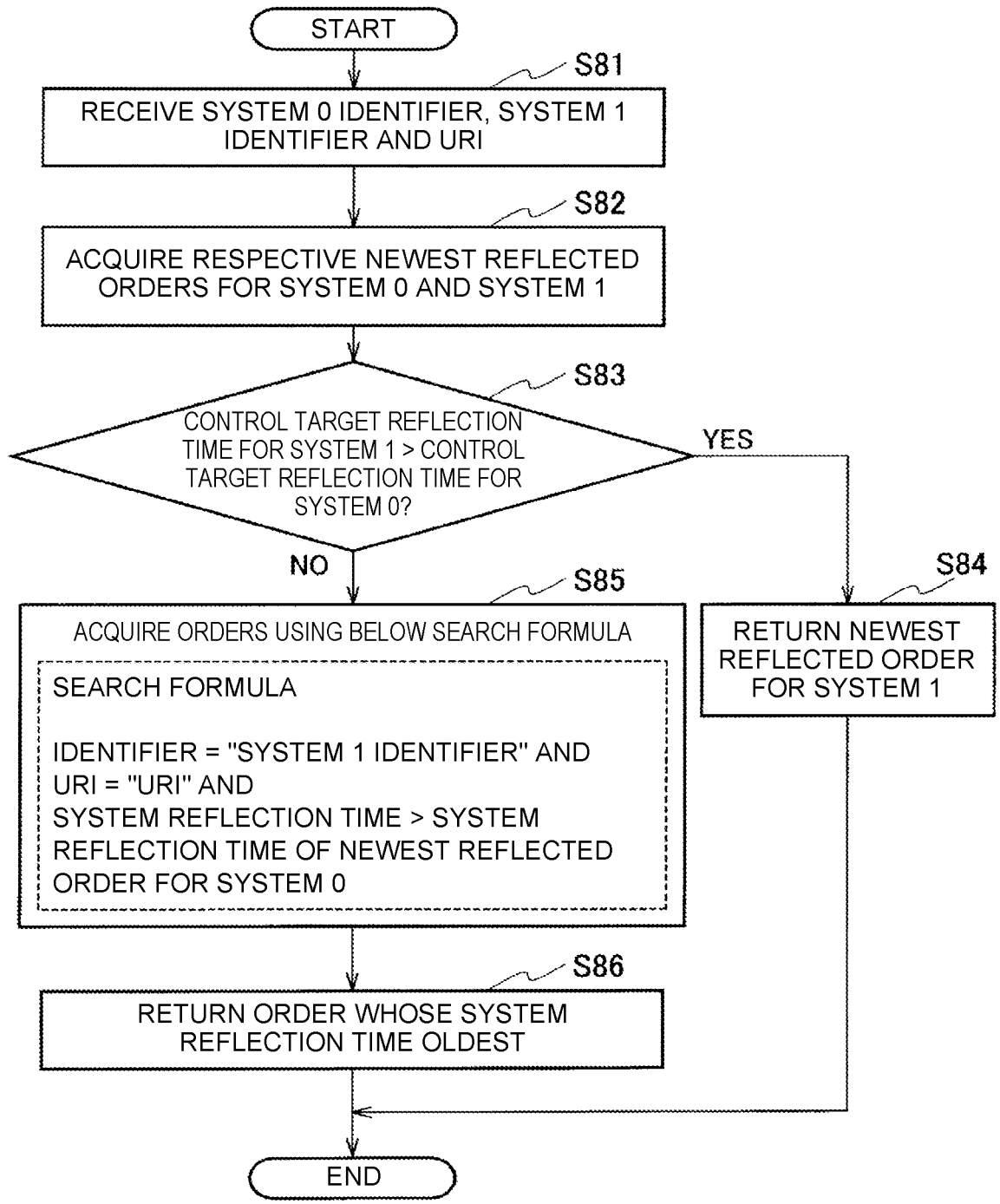
FIG. 16 is a flowchart illustrating a flow of processing for acquiring an order for restoration of the system 1.

Upon the processing in FIG. 16 being executed, in step S82, the record 140 is acquired as a newest reflected order for the system 0 and the record 120 is acquired as a newest reflected order for the system 1.

In step S83, when the control target reflection time of the record 140 for the system 0 and the control target reflection time of the record 120 for the system 1 are compared, the control target reflection time for the system 1 is earlier than the control target reflection time for the system 0, and thus, processing in step S85 is executed.

In step S85, the records 150, 170 for the system 1, a system reflection time of each record being is later than the system reflection time of the record 140 for the system 0, are acquired.

In step S86, the record 150, which is the oldest in the records acquired in step S85, is returned.

In order to provide a service using a redundant configuration including a system 0 and a system 1, it is necessary to make the system 0 and the system 1 in a same state. The order execution unit 3 executes an order for the control target 4 with the redundant configuration in the order of the system 0 and the system 1, and in the order record management apparatus 1, an order record is registered in the order of the system 0 and the system 1.

When the control target 4 is restored based on the table in FIG. 17, the newest reflected order of the record 140 is executed for the system 0 and the order of the record 150 is executed for the system 1.

Consequently, the control target 4 can be restored with the redundant configuration including the system 0 and the system 1. Subsequently, where a failed order is provided again, the records 160, 170, which are newest executed orders for the system 0 and the system 1, respectively, are acquired and reflected in the control target 4.

Note that if a control target reflection time for the system 0 is earlier than a control target reflection time for the system 1, the state of the system 0 is older than the state of the system 1, and thus, the state of the system 0 is brought into agreement with a state of a newest reflected order for the system 1. More specifically, the newest reflected order is executed for the system 1. For the system 0, an order that is newest in orders whose respective system reflection times are earlier than a system reflection time of the newest reflected order for the system 1, which have been acquired in steps S75 and S76 illustrated in the flowchart in FIG. 15.

As described above, according to the present embodiment, the order record storage unit 12 that stores an order record in association with a plurality of time axes, the order record registration unit 11 that receives an order record and registers the order record in association with the plurality of time axes in the order record storage unit 12, and the order record acquisition unit 13 that when a retrieval request with a task type designated is received, retrieves an order record from the order record storage unit 12 according to the task type using the plurality of time axes are provided. Consequently, the present embodiment enables restoration in consistency with a service state.

According to the present embodiment, the order record registration unit 11 registers a record in the order record storage unit 12, the record being obtained by an order record being associated with a control target reflection time that is a time of reflection of the relevant order in a control target, a control target cancellation time that is a time of cancellation of the order for the control target, and a system reflection time that is a time of execution of the order and a system reflection cancellation that is a time of cancellation of the order. The control target reflection time and the control target cancellation time represent a state of reflection in the control target 4, and the system reflection time and the system reflection cancellation represent a state of execution of the order. By use of the two time axes, at the time of retrieval, newest reflection and execution states can easily be retrieved based on a current time.

Figure 18:
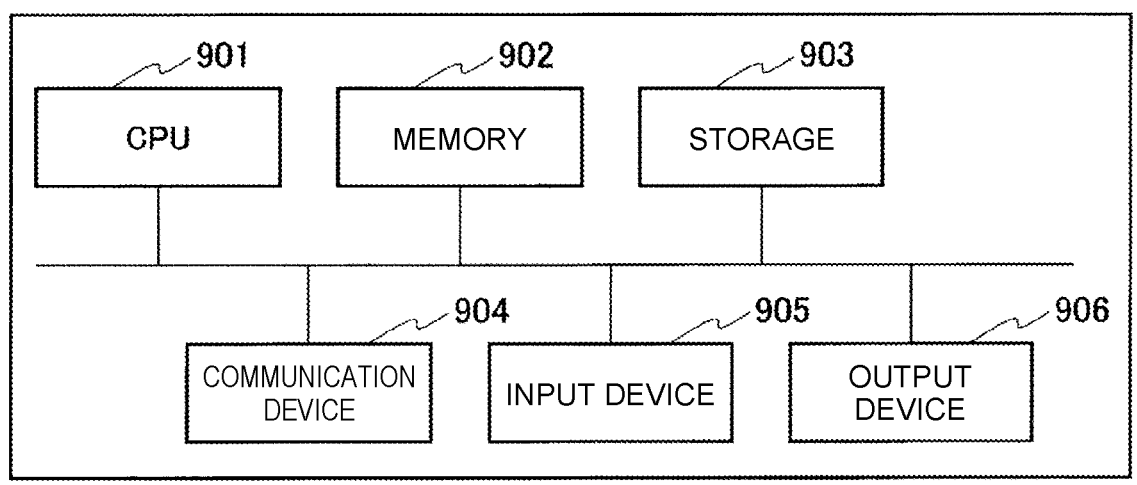
FIG. 18 is a diagram illustrating an example of a hardware configuration of the order record management apparatus.

For the above-described order record management apparatus 1, for example, a general-purpose computer system including a central processing unit (CPU) 901, a memory 902, a storage 903, a communication device 904, an input device 905 and an output device 906, which is illustrated in FIG. 18, can be used. The order record management apparatus 1 is implemented by a predetermined program loaded on the memory 902 being executed by the CPU 901 in the computer system. This program can be recorded on a computer-readable recording medium such as a magnetic disk, an optical disk or a semiconductor memory and can also be distributed via a network.

REFERENCE SIGNS LIST

1 Order record management apparatus
11 Order record registration unit
12 Order record storage unit
13 Order record acquisition unit
3 Order execution unit
4 Control target
5 Maintenance staff person

The invention claimed is:

1. A record management apparatus for managing an order record of an order executed for a control target, the record management apparatus comprising:
    a record storage unit, including one or more processors, configured to store the order record in association with a plurality of time axes;
    a record registration unit, including one or more processors, configured to:
        receive the order record, wherein the order record comprises a first identifier, a first URI, and a first Body part;
        determine a type of the order record is a modification for the control target that comprises a first system and a redundant second system;
        retrieve a first record that comprises the first identifier, the first URI, a control target reflection time, a control target cancellation time, a system reflection time, and a system cancellation time;
        invalidate the retrieved first record by storing a current time as the system cancellation time;
        generate a second record that comprises a second identifier, a second URI, a second Body part, and the control target reflection time;
        store, in the second record, a current time as a control target cancellation time and data indicating infinity as a system cancellation time;
        generate a third record the first identifier, the first URI, and the first Body part;
        store, in the third record, the current time as a control target reflection time, the current time as a system reflection time, the data indicating infinity as the control target cancellation time, and the data indicating infinity as the system cancellation time;
        store, in the record storage unit, the generated second record and the generated third record;
    and
    a record acquisition unit, including one or more processors, configured to retrieve, when a retrieval request with a task type designated is received, the order record from the record storage unit using the identifier, the URI, the control target reflection time of the order record, the control target cancellation time, the system reflection time, and the system cancellation time.

2. The record management apparatus according to claim 1, wherein:
    the type of the order is any of new registration, deletion, and order failure; and
    if the type of the order is new registration, the record registration unit is configured to register a new record including an order record of an order newly registered, a current time being input as a first time and a third time,
    if the type of the order is deletion, the record registration unit is configured to register a new record including an order record of a deleted order, a current time being input as a second time, and input the current time as a fourth time of the record of the deleted order, and if the type of the order is order failure, the record registration unit is configured to register a new record including an order record of a failed order, a current time being input as the third time.

3. The record management apparatus according to claim 2, wherein:

the record acquisition unit is configured to receive a retrieval request with an order designated as a take type, the order being any of an order last reflected in the control target, an order last executed, an order for restoration of the first system and an order for restoration of the redundant second system, if the task type is an order last reflected in the control target, the record acquisition unit is configured to retrieve a record, the first time of the record being earlier than a current time, the second time of the record being not earlier than the current time, the third time of the record being earlier than the current time, the fourth time of the record being not earlier than the current time, if the task type is an order last executed, the record acquisition unit is configured to retrieve a record, the third time of the record being newest in one or more records, the second time of each record being not earlier than a current time, the fourth time of each record being not earlier than the current time, if the task type is an order for restoration of the first system, the record acquisition unit is configured to compare the first time of an order last reflected in the first system and the first time of an order last reflected in the redundant second system, and, if the first time of the order last reflected in the first system is later than the first time of the order last reflected in the redundant second system, retrieve the order last reflected in the first system, and if the first time of the order last reflected in the first system is not earlier than the first time of the order last reflected in the redundant second system, retrieve a record, the third time of the record being newest in one or more records, the third time of each record being earlier than the third time of the order last reflected in the redundant second system, and if the task type is an order for restoration of the redundant second system, the record acquisition unit is configured to compare the first time of the order last reflected in the first system and the first time of the order last reflected in the redundant second system, and if the first time of the order last reflected in the redundant second system is later than the first time of the order last reflected in the first system, retrieve the order last reflected in the redundant second system, and if the first time of the order last reflected in the redundant second system is not earlier than the first time of the order last reflected in the first system, retrieve a record, the third time of the record being oldest in one or more records, the third time of each record being later than the third time of the order last reflected in the first system.

4. A record management method for managing an order record of an order executed for a control target, the record management method performed by a computer comprising:

receiving the order record, wherein the order record comprises a first identifier, a first URI, and a first Body part;

determining a type of the order record is a modification for a control target that comprises a first system and a redundant second system;

retrieving a first record that comprises the first identifier, the first URI, a control target reflection time, a control target cancellation time, a system reflection time, and a system cancellation time;

invalidating the retrieved first record by storing a current time as the system cancellation time;

generating a second record that comprises a second identifier, a second URI, a second Body part, and the control target reflection time;

storing, in the second record, a current time as a control target cancellation time and data indicating infinity as a system cancellation time;

generating a third record the first identifier, the first URI, and the first Body part;

storing, in the third record, the current time as a control target reflection time, the current time as a system reflection time, the data indicating infinity as the control target cancellation time, and the data indicating infinity as the system cancellation time;

storing, in a record storage unit, the generated second record and the generated third record; and retrieving, when a retrieval request with a task type designated is received, the order record from the record storage unit using the identifier, the URI, the control target reflection time of the order record, the control target cancellation time, the system reflection time, and the system cancellation time.

5. A non-transitory computer-readable medium storing software comprising instructions executable by one or more computers which, upon such execution, cause the one or more computers to perform operations comprising:

managing an order record of an order executed for a control target, comprising:

storing the order record in association with a plurality of time axes;

receiving the order record, wherein the order record comprises a first identifier, a first URI, and a first Body part;

determining a type of the order record is a modification for a control target that comprises a first system and a redundant second system;

retrieving a first record that comprises the first identifier, the first URI, a control target reflection time, a control target cancellation time, a system reflection time, and a system cancellation time;

invalidating the retrieved first record by storing a current time as the system cancellation time;

generating a second record that comprises a second identifier, a second URI, a second Body part, and the control target reflection time;

storing, in the second record, a current time as a control target cancellation time and data indicating infinity as a system cancellation time;

generating a third record the first identifier, the first URI, and the first Body part;

storing, in the third record, the current time as a control target reflection time, the current time as a system reflection time, the data indicating infinity as the control target cancellation time, and the data indicating infinity as the system cancellation time;

storing, in a record storage unit, the generated second record and the generated third record;

and
retrieving, when a retrieval request with a task type designated is received, the order record from the record storage unit using the identifier, the URI, the control target reflection time of the order record, the control target cancellation time, the system reflection time, and the system cancellation time.

6. The non-transitory computer-readable medium according to claim 5, further comprising:
the type of the order is any of new registration, deletion, and order failure; and
if the type of the order is new registration, registering a new record including an order record of an order newly registered, a current time being input as a first time and a third time,
if the type of the order is deletion, registering a new record including an order record of a deleted order, a current time being input as a second time, and input the current time as a fourth time of the record of the deleted order, and
if the type of the order is order failure, registering a new record including an order record of a failed order, a current time being input as the third time.

7. The non-transitory computer-readable medium according to claim 6, further comprising:
receiving a retrieval request with an order designated as a take type, the order being any of an order last reflected in the control target, an order last executed, an order for restoration of the first system and an order for restoration of the redundant second system,
if the task type is an order last reflected in the control target, retrieving a record, the first time of the record being earlier than a current time, the second time of the record being not earlier than the current time, the third time of the record being earlier than the current time, the fourth time of the record being not earlier than the current time,
if the task type is an order last executed, retrieving a record, the third time of the record being newest in one or more records, the second time of each record being not earlier than a current time, the fourth time of each record being not earlier than the current time,
if the task type is an order for restoration of the first system, the record comparing the first time of an order last reflected in the first system and the first time of an order last reflected in the redundant second system, and,
if the first time of the order last reflected in the first system is later than the first time of the order last reflected in the redundant second system, retrieving the order last reflected in the first system, and
if the first time of the order last reflected in the first system is not earlier than the first time of the order last reflected in the redundant second system, retrieving a record, the third time of the record being newest in one or more records, the third time of each record being earlier than the third time of the order last reflected in the redundant second system, and
if the task type is an order for restoration of the redundant second system, comparing the first time of the order last reflected in the first system and the first time of the order last reflected in the redundant second system, and
if the first time of the order last reflected in the redundant second system is later than the first time of the order last reflected in the first system, retrieving the order last reflected in the redundant second system, and if the first time of the order last reflected in the redundant second system is not earlier than the first time of the order last reflected in the first system, retrieving a record, the third time of the record being oldest in one or more records, the third time of each record being later than the third time of the order last reflected in the first system.

8. The record management method according to claim 4, further comprising:
the type of the order is any of new registration, deletion, and order failure; and
if the type of the order is new registration, registering a new record including an order record of an order newly registered, a current time being input as a first time and a third time,
if the type of the order is deletion, registering a new record including an order record of a deleted order, a current time being input as a second time, and input the current time as a fourth time of the record of the deleted order, and
if the type of the order is order failure, registering a new record including an order record of a failed order, a current time being input as the third time.

9. The record management method according to claim 8, further comprising:
receiving a retrieval request with an order designated as a take type, the order being any of an order last reflected in the control target, an order last executed, an order for restoration of the first system and an order for restoration of the redundant second system,
if the task type is an order last reflected in the control target, retrieving a record, the first time of the record being earlier than a current time, the second time of the record being not earlier than the current time, the third time of the record being earlier than the current time, the fourth time of the record being not earlier than the current time,
if the task type is an order last executed, retrieving a record, the third time of the record being newest in one or more records, the second time of each record being not earlier than a current time, the fourth time of each record being not earlier than the current time,
if the task type is an order for restoration of the first system, comparing the first time of an order last reflected in the first system and the first time of an order last reflected in the redundant second system, and,
if the first time of the order last reflected in the first system is later than the first time of the order last reflected in the redundant second system, retrieving the order last reflected in the first system, and
if the first time of the order last reflected in the first system is not earlier than the first time of the order last reflected in the redundant second system, retrieving a record, the third time of the record being newest in one or more records, the third time of each record being earlier than the third time of the order last reflected in the redundant second system, and
if the task type is an order for restoration of the redundant second system, comparing the first time of the order last reflected in the first system and the first time of the order last reflected in the redundant second system, and
if the first time of the order last reflected in the redundant second system is later than the first time of the order last reflected in the first system, retrieving the order last reflected in the redundant second system, and if the first time of the order last reflected in the redundant second system is not earlier than the first time of the order last reflected in the first system, retrieving a record, the third time of the record being oldest in one or more records, the third time of each record being later than the third time of the order last reflected in the first system.

* * * * *